United States Patent
Angeloni

(10) Patent No.: US 6,796,755 B2
(45) Date of Patent: Sep. 28, 2004

(54) GUIDE FOR ROTARY CUTTER

(76) Inventor: Joseph J. Angeloni, 42 Electric St., Peckville, PA (US) 18452

( * ) Notice: Subject to any disclaimer, the term of this patent is extended or adjusted under 35 U.S.C. 154(b) by 0 days.

(21) Appl. No.: 10/234,774

(22) Filed: Sep. 3, 2002

(65) Prior Publication Data

US 2004/0042862 A1 Mar. 4, 2004

(51) Int. Cl.⁷ .................................. B23C 1/20
(52) U.S. Cl. ........................ 409/182; 409/180
(58) Field of Search .................. 409/178, 182, 409/180, 138; 144/136.95, 154.5, 253.5

(56) References Cited

U.S. PATENT DOCUMENTS

| | | | | |
|---|---|---|---|---|
| 3,913,447 A | * | 10/1975 | Roche | 409/138 |
| 4,156,990 A | * | 6/1979 | Rutkowski | 409/180 |
| 4,504,178 A | * | 3/1985 | Seidenfaden | 409/138 |
| 4,632,162 A | | 12/1986 | Angeloni | |
| 5,004,385 A | * | 4/1991 | Kishi | 409/180 |
| 5,138,797 A | * | 8/1992 | Siden | 451/241 |
| 6,491,483 B1 | * | 12/2002 | Ford | 409/182 |

OTHER PUBLICATIONS

Stewart–MacDonald; Catalog #91, p. 26.

* cited by examiner

Primary Examiner—A. L. Wellington
Assistant Examiner—Dana Ross
(74) Attorney, Agent, or Firm—Gerald E. Helget; Briggs & Morgan, P.A.

(57) ABSTRACT

A guide apparatus for a hand-held rotary cutting machine to allow the operator to accurately and uniformly remove material from a work-piece and to shield the operator from exposure to the cutting tool. The apparatus employs a stepped guide to limit and control the depth of cut.

6 Claims, 2 Drawing Sheets

DIRECTION OF FEED →

GUIDE FOR ROTARY CUTTER

BACKGROUND OF THE INVENTION

The present invention pertains to high-speed hand held rotary cutting machines and more particularly to an assembly for guiding and controlling the depth of the cut.

In working with wood or other materials, it is often desirable to remove a small but uniform amount of material along a pre-cut edge.

Powered, portable, hand-held rotary cutting tools are well known in the art such as the Dremel® and Moto® type tools used by model makers or similar personnel.

These powered, rotary cutting machines are often hand held and hand guided.

It is often very difficult to control the depth and straightness of the cut when guiding such machines by hand. The need in the art for a system for controlling the depth and straightness of the cut with a hand held rotary machine tool of this type has not yet been met.

The field of hand held rotary cutting machines is in need of improvements in the area of depth control and straightness of cut.

In addition, earlier machines do not address the need of protecting the operator from unnecessary exposure to an unshielded cutter.

SUMMARY OF THE INVENTION

The primary object of the present invention is to provide a guide accessory for easy attachment to commercially available hand held rotary cutting machines.

With the guide attachment, the rotary cutting machine is able to accurately and uniformly remove material. Examples are trimming wood or plastic model airplane parts for proper fit or chamfering sharp edges.

Another object of the invention is to help shield the operator from the dust and debris of the cutting operation.

A further object of this invention is to limit the operator to cutting tool exposure.

Another object of this invention is to protect the cutting tool from damage.

The present invention employs a novel, stepped guide to limit and control the depth of cut.

This invention provides an in-feed guide surface, offset a distance from the cutting circle and an out-feed guide surface parallel to the in-feed surface and tangent to the cutting circle. This difference in the distance from in-feed to out-feed surfaces is the amount of material removed.

In operation, the leading or in-feed surface of the guide is placed in contact with the surface of the workpiece. As the cutting machine is advanced into the workpiece, the exposed portion of the cutter removes material, allowing the out-feed or tangent surface of the guide to ride on the newly cut work-piece surface.

Other objects and advantages of this invention will be apparent from the following description when read in reference to the accompanying drawings.

DETAILED DESCRIPTION OF THE PREFERRED EMBODIMENT

Figure 1:
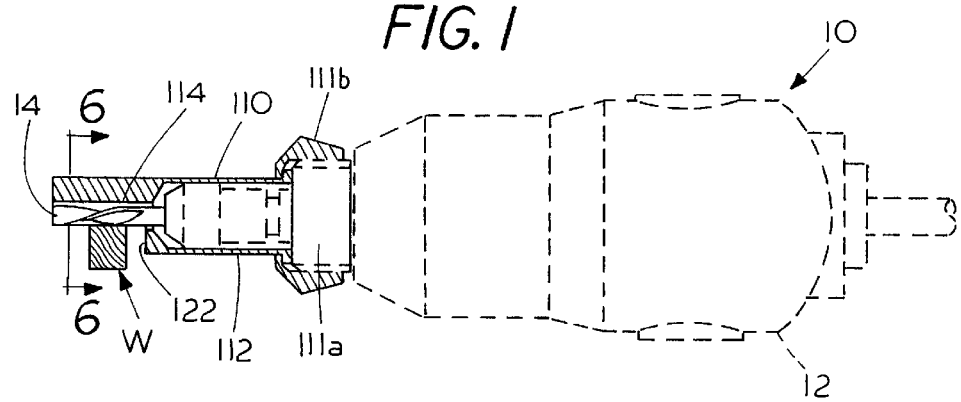
FIG. 1 is an elevational view of a hand-held rotary cutting machine (shown in phantom) with the guide apparatus of the present invention attached thereto.

As shown in FIG. 1, the present invention is a guide apparatus 110 for attachment to a hand-held rotary cutting machine 10, which has a motor 12 and a cutting head 14.

The guide apparatus 110 comprises an enclosure 112 adapted to partially enclose the cutting head 14 and a guide surface 114 adapted to contact a work-piece W from which material is to be removed.

The guide apparatus 110 is attached to the cutting machine 10 by any suitable attachment mechanism, depending on the manufacturer of the cutting machine 10. For example, but without limitation, the cutting machine 10 may have a threaded end 111a against which the guide apparatus 110 may abut and be secured by a threaded cap 111b.

The guide surface 114 further preferably comprises an in-feed surface 116 adjacent the cutting head 14 and an out-feed surface 118 opposite the in-feed surface 116 and adjacent the cutting head 14.

Figure 2A:
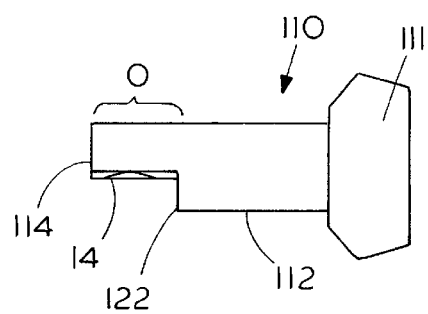
FIG. 2a is an elevational view of the guide apparatus of the present invention.
Figure 2B:
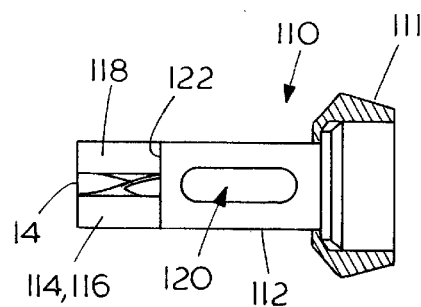
FIG. 2b is similar to FIG. 2a, but rotated 90 degrees to show other aspects of the invention.
Figure 2C:
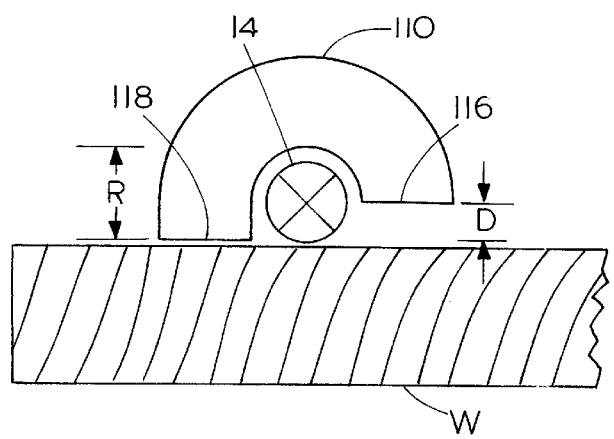
FIG. 2c is a cross-section taken at approximately the lines 6 of FIG. 1.

As shown in FIG. 2c, the in-feed surface 116 is offset a distance D from the out-feed surface 118, while the out-feed surface 118 is tangent to the radius of the cutting head. The offset D is the amount of material removed.

Figure 3:
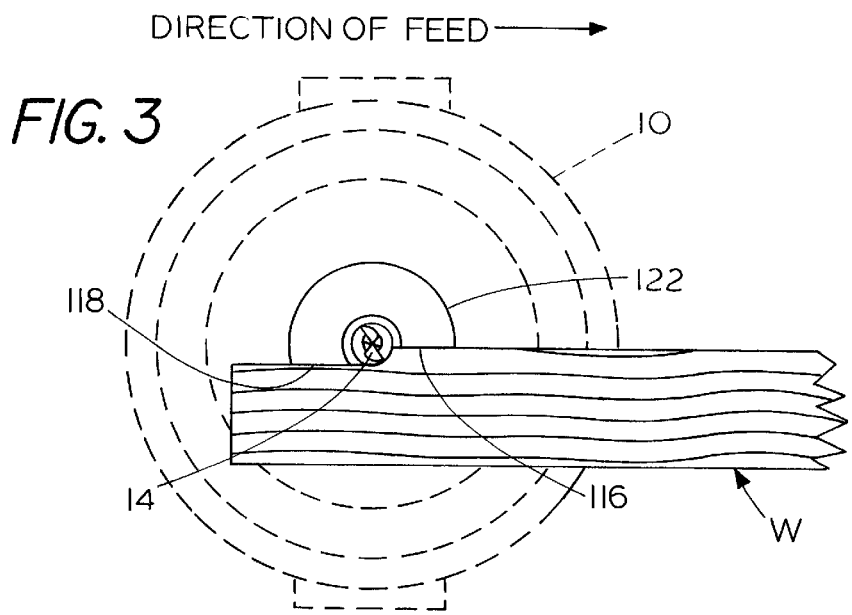
FIG. 3 is an elevational view of a work-piece being cut with the present invention.

In one embodiment, shown in FIGS. 2a and 2b, the guide surface 114 is planar. As shown in FIG. 3, this embodiment is used in removing material from the work-piece W in a cut of uniform depth, linearly along the work-piece W.

Figure 4A:
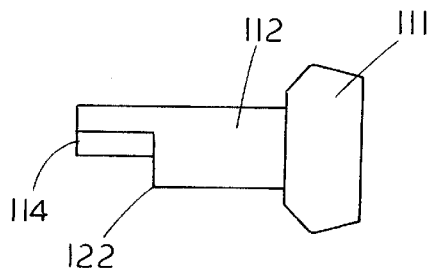
FIG. 4a is an elevational view of a second embodiment of the present invention having a radiused guide surface.
Figure 4B:
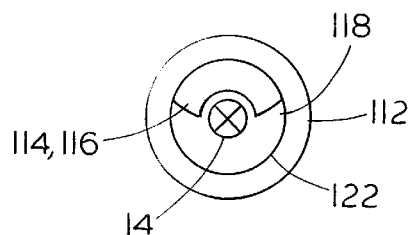
Figure 5:
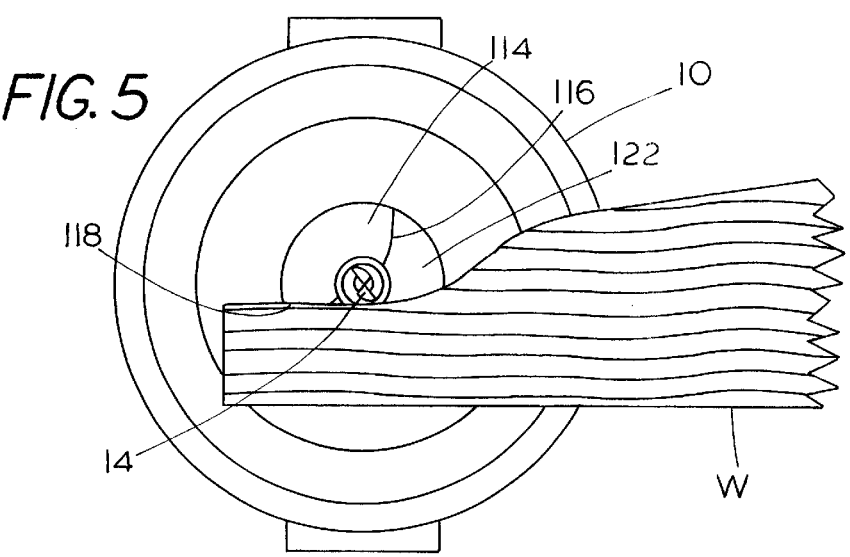
FIG. 5 is an elevational view of a work-piece being cut with the second embodiment of the present invention.

As second embodiment, shown in FIGS. 4a and 4b, has a guide surface 114 that is radiused. FIG. 5 shows the use of this embodiment in cutting a curved cut into the work-piece W.

In both embodiments, the apparatus 110 preferably further comprises an exit opening 120 adapted to permit material removed from the work-piece W to exit the enclosure 112.

Either embodiment may also further comprise a stop surface 122 adapted to contact the work-piece W. As seen in the drawings, the stop surface is substantially perpendicular to the guide surface. The stop surface 122 is adapted to be offset a distance from an end of the cutting head, wherein the offset 0 controls the width of the cut. The ofset O may be varied.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. In a hand-held rotary cutting machine having a motor and an elongate cutting head driven by the motor, the cutting head being adapted to remove material from a work-piece, a guide apparatus comprising:

(a) an enclosure adapted to partially enclose the cutting head; and (b) a planar guide surface adapted to contact the work-piece, comprising:

(1) an in-feed surface adjacent and parallel to the cutting head; and (2) an out-feed surface opposite the in-feed surface and adjacent and parallel to the cutting head and offset below and non-coplanar with and parallel to the in-feed surface.

2. The guide apparatus of claim 1, further comprising an exit opening adapted to permit material removed from the work-piece to exit the enclosure.

3. The guide apparatus of claim 1, further comprising a stop surface adapted to contact the work-piece.

4. The guide apparatus of claim 3, wherein the stop surface is substantially perpendicular to the guide surface.

5. The guide apparatus of claim 4, wherein the stop surface is adapted to be offset a distance from an end of the cutting head, wherein the offset controls the width of cut.

6. The guide apparatus of claim 5, wherein the offset is variable.

* * * * *